Nov. 15, 1966  H. F. TOMEK  3,285,644
COMPOSITE PANEL AND SUPPORT WITH INCREASED
RUPTURE RESISTANT CONNECTION
Filed Sept. 23, 1964  2 Sheets-Sheet 1
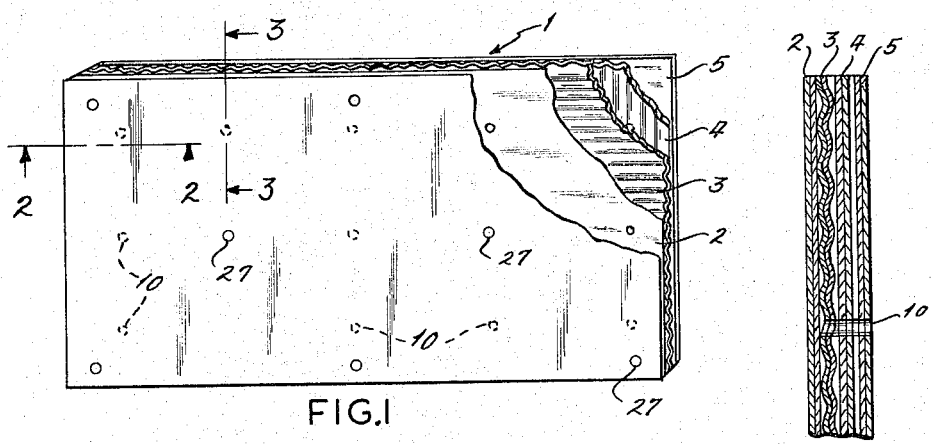
FIG.1
FIG.3
FIG.2
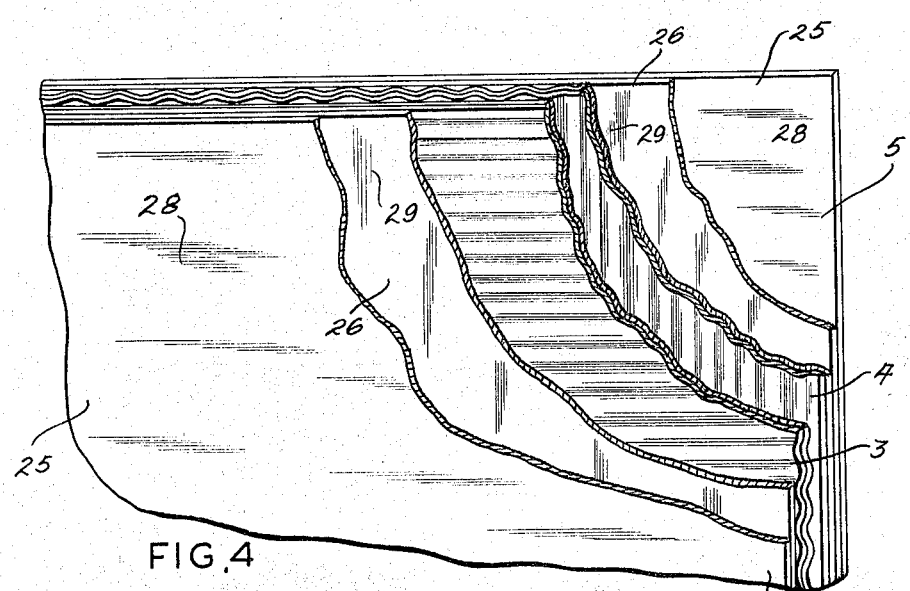
FIG.4
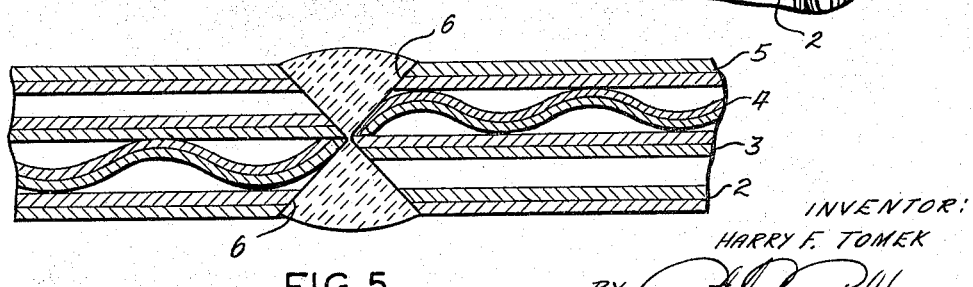
FIG.5
INVENTOR:
HARRY F. TOMEK
BY
ATTORNEY

INVENTOR:
HARRY F. TOMEK
BY
ATTORNEY,

United States Patent Office 3,285,644
Patented Nov. 15, 1966

3,285,644
COMPOSITE PANEL AND SUPPORT WITH INCREASED RUPTURE RESISTANT CONNECTION
Harry F. Tomek, 4524 Tennessee, St. Louis, Mo.
Filed Sept. 23, 1964, Ser. No. 400,633
3 Claims. (Cl. 287—189.36)

This invention relates to structural members, and has particular application to structural members with composite panels, suitable for a wide variety of applications. This application is a continuation-in-part of my application Serial No. 273,709, filed April 17, 1963, now abandoned.

One of the objects of this invention is to provide a metal panel of greater rigidity, weight for weight, than panels known heretofore.

Another object is to provide such panels which can be combined readily to produce composite panels of various thicknesses and strengths, using easily fabricated unit panels as elements of the composite panel.

Still another object is to provide a structure with great resistance to rupture.

Other objects will become apparent to those skilled in the art in the light of the following description and accompanying drawing.

In the drawing,

FIGURE 1 is a side view, in perspective, partly broken away, showing one embodiment of panel of this invention;

FIGURE 2 is a sectional view taken along the line 2—2 of FIGURE 1;

FIGURE 3 is a sectional view taken along the line 3—3 of FIGURE 1;

FIGURE 4 is an enlarged detail fragmentary view of the broken away portion of FIGURE 1;

FIGURE 5 is an enlarged sectional view through the edges of contiguous panels, welded together, showing the weld;

Figure 6:
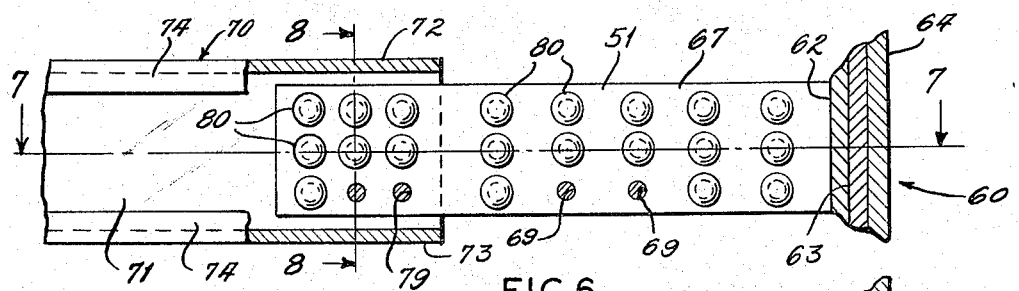
FIGURE 6 is top plan view, partly in section and partly broken away, of one embodiment of panel and support structure of this invention.

In accordance with this invention, generally stated, a structural panel member is provided, which is made up of a plurality of composite sheets of rolled metal, joined to extend substantially co-extensively, each of the composite sheets being made up of a plurality of single sheets, successively contiguous ones of which are disoriented relative to one another with respect to the direction in which they were rolled. The superior rigidity of the panel of this invention is believed to derive from the fact that the composite sheets from which the panel is constructed are each made up in turn of sheets of metal in which the roll orientations of contiguous sheets is preferably at right angles to one another, although an intermediate angular relationship may be employed.

In the panel and support structure of this invention, at least two of the sheets of the composite panel are bent at substantially right angles to the plane of the panel, to form multi-ply flange members which are connected to a beam member in a peculiar way.

The flanges, or extension plates secured thereto (which are embraced within the term "flanges"), are secured axially along a beam the end of which is spaced a substantial distance from the plane of the panel. The means for securing the panel and the beam to one another are such as to permit relative movement of the one toward the other under conditions of extreme and sudden load, while maintaining a frictional engagement between them, and a substantial structural integrity.

Referring now to the drawing for one illustrative embodiment of panel, this invention, reference numeral 1 indicates a panel, which, in this embodiment, is made up of four composite sheets 2, 3, 4 and 5. In this embodiment, the sheet 2 is an imperforate facing sheet. Sheets 2 and 5 are plain, and, except that the sheet 5 is perforated, identical. Each of sheets 3, 4, and 5 is provided with perforations 10, which permit ready welding of any of those sheets to the facing sheet 2, and to one another. The perforations may also be used to receive rivets.

The panel 1, in this embodiment, is provided with a welding bevel 6 around its outer margins, to facilitate the welding of contiguous panel units. The sheets 2, 3, 4 and 5 in this embodiment are joined together by welding at various of the perforations 10 as the panel is built up.

Each of the composite sheets is made up of at least two sheets. For example, the flat outer sheets 2 and 5 are made up of two plain sheets 25 and 26, spot welded at points 27. The sheet 25 has been rolled in a direction parallel to the bottom of the drawing, as indicated at 28. The sheet 26 has been rolled in a direction perpendicular to the bottom of the drawing, as indicated at 29.

Each of the other composite sheets, corrugated and plain, is made up in the same way. The corrugated sheets may be made up of flat sheets, disoriented with respect to the direction of rolling, and subsequently corrugated or the sheets may be corrugated first and superimposed. In the latter case, however, one of the two sheets making up a two ply composite corrugated sheet must, of course, be corrugated at right angles to the direction of rolling and the other parallel to the direction of rolling.

It can be seen that stocks of composite sheets can be maintained, and that panels of various thicknesses and strengths can be provided by assembling panels of varying numbers and kinds of composite sheets. For example, one composite plain sheet and one composite corrugated sheet can be joined to form a panel only half as thick as the panel 1, but which, nevertheless, has great rigidity and strength. By the same token, composite corrugated sheets and plain panels can be added to the panel 1, to form a panel of even greater thickness and strength.

The panels of this invention may be used for building purposes or they may be used for such things as desks and similar furniture, or doors, or for any other desired purpose to which panels can be put.

For maximum strength, rigidity, and durability the sheets making up each composite sheet are welded together around the entire periphery of the composite sheet.

Numerous variations in the construction of the panels of this invention within the scope of the appended claims, will become apparent to those skilled in the art in the light of the foregoing description. For example, each composite sheet may be made up of three or more single sheets each contiguous one of which is disoriented relative to the next, with respect to the direction in which they were rolled.

Figure 7:
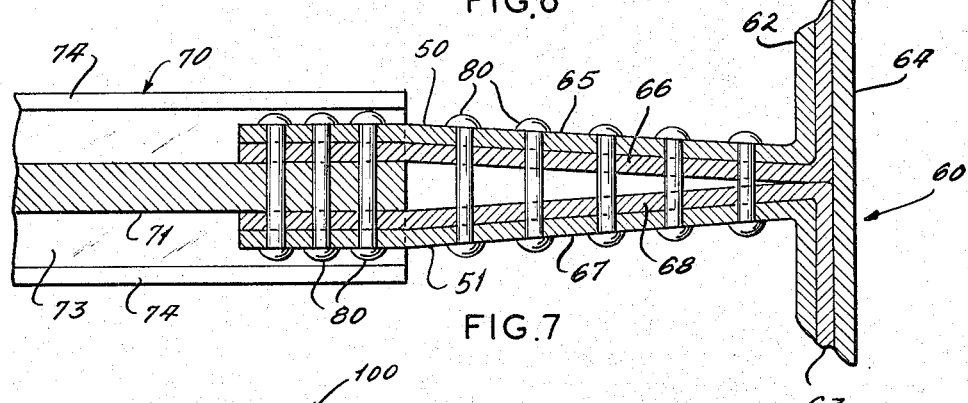
FIGURE 7 is a sectional view taken along the line 7—7 of FIGURE 6.
Figure 8:
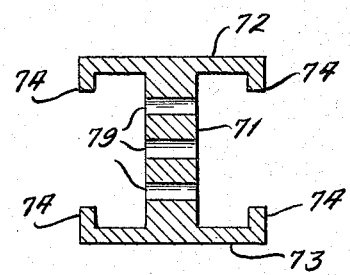
FIGURE 8 is a sectional view taken along the line 8—8 of FIGURE 6, with connecting rivets removed.

Referring now to FIGURES 6–8 for one illustrative embodiment of panel-support structure of this invention, reference numeral 60 indicates a panel of this invention with sheets 62, 63 and 64, all disoriented relative to one another. A beam 70, in the illustrative embodiment shown, is an I-beam, with a central web 71, upper cross member 72 and lower cross member 73. In this embodiment of beam, lips 74, extending along the outer edges of the cross members 72 and 73, project toward one another.

A section of the sheets 62 and 63 is bent up from the plane of the panel at substantially right angles to form connecting flanges 50 and 51, made up of plies 65 and 66 and 67 and 68 respectively. The flanges 50 and 51 abut one another at their panel ends, and are spread at their free ends a distance sufficient to receive the web 71 of the beam 70.

The flanges 50 and 51 are provided with a multiplicity of transversely aligned rivet-receiving holes 69. The web 71, at the outer end of the beam 70, is also provided with holes, 80, adapted to be aligned with at least some of the holes 69. Rivets 80 extend through the holes 69, and, through a part of the length of the flanges 50 and 51 at the outer end of the flanges, also through the holes 79 in the web 71.

In the operation of the structure shown in FIGURES 6–8, the construction of the panel 60 provides great resistance to rupture, as has been explained heretofore. If the panel is subjected to a severe rupturing force, as, for example, in a collision of ships, in which the panel 60 serves as a ship's plate and the beam 70 runs athwartships, the initial shock will tend to shear the rivets 80, which will permit the connecting flanges 50 and 51 along with the panel 60, to move toward the supporting beam 70. However, as the relative movement occurs, the rivets 80 which lie between the beam 70 and the panel 60 will lie in the way of continued movement, will have to be sheared one by one, and, because of the wedge-shaped space between the plates, will ensure continued and increasing frictional resistance to movement of the panel 60 and beam 70 toward one another.

Figure 9:
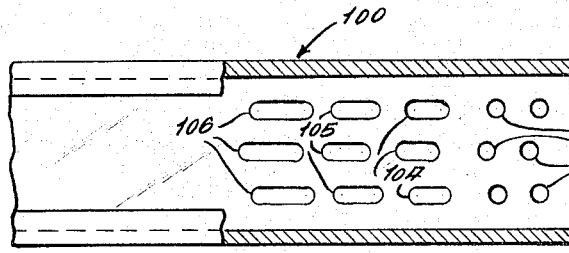
FIGURE 9 is a plan view, partly broken away, of flange and beam members of another embodiment of panel and support structure of this invention.
Figure 10:
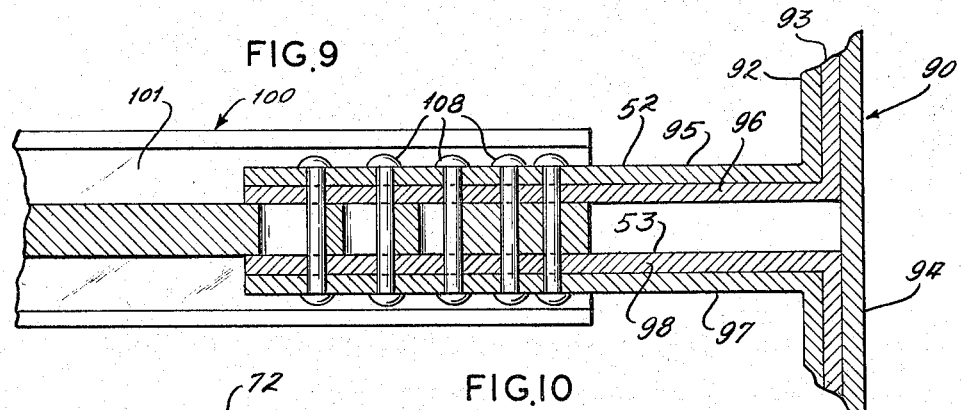
FIGURE 10 is a longitudinal sectional view of the embodiment of panel and support structure shown in FIGURE 9.

In the embodiment of structure shown in FIGURES 9 and 10, a panel 90 is made up of plates 92, 93 and 94, in the manner already described in respect of the other embodiments of panel. A section of the sheets 92 and 93 is bent out substantially at right angles to the plane of the panel 90, to form connecting flanges 52 and 53, made up of plies 95 and 96 and 97 and 98, respectively. The connecting flanges 52 and 53, in this embodiment, are parallel with one another, with a space between the flanges wide enough to accommodate snugly a web 101 of a beam 100.

The web 101 is provided with holes 102, 103, 104, 105 and 106. The holes 102 and 103 are round, and of a size to admit the stem of rivets 108. The holes 104, 105 and 106 are elongated, with their long axes parallel with one another, and the extent of the elongation varying toward increasing length from opening 104 to opening 106, all as shown particularly in FIGURE 9. Aligned holes in flanges 52 and 53 are positioned to be directly aligned with holes 102 and 103 in the web 101, and to be aligned with the ends of the holes 104, 105 and 106 nearest the plate 90.

In operation, upon an initial impact of sufficient force, the rivets 108 in the holes 102 and 103 will be sheared, and the flanges 52 and 53, with the panel 90, will move toward the beam 100. As the rivets in the holes 104 reach the inner ends of the holes, they, too, will be sheared. However, the continued frictional resistance toward movement of the plates along the beam, will, as in the embodiment shown in FIGURES 6–8, tend to absorb the shock, and resist further movement.

When the flanges are formed integrally with the plates, the panels are not, then, reversible with respect to one another as they are, for example in the illustration of FIGURE 5. In that figure, successive panels are turned one hundred eighty degrees with respect to one another, so that corrugations in one plane in the left hand panel are at right angles to the corrugations in that plane in the right hand panel. This was merely illustrative of a possible method of construction, and it can be seen that the panels could and normally will both be oriented in the same way.

Numerous variations in the construction of the structures shown in FIGURES 6–10 will be apparent to those skilled in the art in the light of the foregoing disclosure. For example, instead of an I-beam, the beams can be channels, or even cylinders. In the latter case, the flanges may be formed into cylindrical sleeves. In the embodiment shown in FIGURES 9 and 10, the holes can be positioned in reverse order, so that the rivets farthest from the panel are the first to be sheared, and those adjacent the panel, the last. These variations are merely illustrative.

Having thus described the invention, what is claimed and desired to be secured by Letters Patent is:

1. A structure comprising a panel made up of a multiplicity of sheets at least two of which have a section integral therewith bent to form connecting multi-ply flange members, a beam connected at one of its ends to said flange members with said end spaced from the said panel a distance to accommodate substantial relative movement of the panel and beam toward one another, shearable securing means securing said beam to said flange members and means for maintaining said flange members and beam in tight frictional engagement after securing means are sheared and while said beam and panel are moving toward one another in response to the application to the said panel of excessive force.

2. A structure comprising a panel made up of a multiplicity of sheets at least two of which have a section integral therewith bent to form spaced parallel, flat, multi-ply connecting flange members, an I-beam, having a central web and two cross members, connected at one of its ends to said flange members, the web of said beam being embraced between said flange members, said web having a multiplicity of holes therein spaced longitudinally, successive of which holes are graduatedly elongated, said flanges having holes aligned with holes in said web and shanked retaining means extending through said holes with a shank closely adjacent the edge of the hole in the web closest the said panel.

3. A structure comprising a panel made up of a multiplicity of sheets at least two of which have a section integral therewith bent to form flat, multi-ply connecting flange members spaced at their outer ends, an I-beam, having a central web and two cross members, connected at one of its ends to said flange members, the web of said beam being embraced between said flange members, said beam terminating at a substantial distance from said panel and said flange members being spaced progressively more closely to one another from the end of the beam to the panel, said flange members having a multiplicity of holes aligned as between the flange members, both along the area which embraces the web of the beam, and along the area between the beam and the panel, said web having holes aligned with holes in said flanges, and shanked retaining members extending through said holes and also the holes in the flanges between the beam and the panel.

References Cited by the Examiner

UNITED STATES PATENTS

| | | | |
|---|---|---|---|
| 130,992 | 9/1872 | Haggett | 29—191 |
| 1,625,061 | 4/1927 | Trout | 29—191 |
| 2,234,960 | 3/1941 | Buelow | 287—189.36 |
| 2,456,055 | 12/1948 | Farrar | 287—189.36 |

FRANK L. ABBOTT, *Primary Examiner.*

R. S. VERMUT, *Assistant Examiner.*